United States Patent [19]
Pietzsch et al.

[11] Patent Number: 5,731,974
[45] Date of Patent: Mar. 24, 1998

[54] METHOD AND APPARATUS FOR THE PREPARATION AND SETUP OF MOBILE WORKING EQUIPMENT

[75] Inventors: Heinz Werner Pietzsch, Karlsruhe; Hans Bronk, Ettlingen, both of Germany

[73] Assignee: Pietzsch Automatisierungstechnik GmbH, Ettlingen, Germany

[21] Appl. No.: 729,488

[22] Filed: Oct. 11, 1996

[30] Foreign Application Priority Data

Oct. 13, 1995 [DE] Germany .............. 195 38 264.1

[51] Int. Cl.⁶ ...................................... G05B 9/02
[52] U.S. Cl. .............. 364/188; 346/424.07; 346/146; 346/474.22; 346/424.05
[58] Field of Search .................. 364/188, 146, 364/474.22, 474.24, 424.01, 424.04, 424.02, 424.03, 424.05, 424.06, 424.07; 395/99, 155

[56] References Cited

U.S. PATENT DOCUMENTS

| | | | |
|---|---|---|---|
| 4,238,037 | 12/1980 | Azovtsev et al. | 212/191 |
| 4,303,973 | 12/1981 | Williamson, Jr. et al. | 364/103 |
| 4,752,012 | 6/1988 | Juergens | 212/154 |
| 4,896,370 | 1/1990 | Kasparian et al. | 455/77 |
| 5,217,126 | 6/1993 | Hayashi et al. | 212/153 |
| 5,220,499 | 6/1993 | Kawamori | 364/188 |
| 5,353,400 | 10/1994 | Nigawara et al. | 395/161 |
| 5,371,895 | 12/1994 | Bristol | 395/800 |
| 5,400,246 | 3/1995 | Wilson et al. | 364/146 |
| 5,485,620 | 1/1996 | Sadre et al. | 395/700 |
| 5,504,880 | 4/1996 | Hirosawa et al. | 395/180 |
| 5,506,787 | 4/1996 | Muhlfeld et al. | 364/474.23 |
| 5,517,404 | 5/1996 | Biber et al. | 364/138 |
| 5,526,268 | 6/1996 | Tkacs et al. | |
| 5,537,605 | 7/1996 | Teece | 395/800 |
| 5,539,650 | 7/1996 | Hehl | 364/476.05 |
| 5,594,858 | 1/1997 | Blevins | 395/326 |

FOREIGN PATENT DOCUMENTS

| | | |
|---|---|---|
| 0008210 A1 | 2/1980 | European Pat. Off. |
| 0 614 845 A2 | 4/1989 | European Pat. Off. |
| 0614845 A2 | 9/1994 | European Pat. Off. |
| 07081887A | 3/1995 | Japan. |
| 2050294 | 1/1981 | United Kingdom. |
| 85/05614 | 12/1985 | WIPO. |

*Primary Examiner*—Reba I. Elmore
*Assistant Examiner*—Ramesh Patel
*Attorney, Agent, or Firm*—Collard & Roe, P.C.

[57] ABSTRACT

A method and apparatus for preparing and setting up mobile working equipment using an interactive control console and specialized programming is provided. The interactive control console provides the user with a decision tree having a plurality of decision groups. The decision groups are sequentially presented to the user for a particular application of the mobile working equipment. The system in transportable and can be programmed for any mobile working construction equipment. The interactive control console and method associated therewith provides enhanced User interface, and assures proper configuration within safety regulations and standards.

3 Claims, 3 Drawing Sheets

METHOD AND APPARATUS FOR THE PREPARATION AND SETUP OF MOBILE WORKING EQUIPMENT

BACKGROUND OF THE INVENTION

1. Field of the Invention

The invention relates to control systems. More particularly, it relates to a method and an interactive control apparatus for the preparation and setup of mobile working equipment.

2. The Prior Art

Generally, mobile working equipment has a large number of make-ups, adjustments and devices that are adaptable to a given application. It is possible, for example in connection with crane equipment, to select the length of the jib or support depending on the work site, the carrying load and other variable parameters. After the mobile working equipment has been made up and set up accordingly, and before the operation is started, the operating personnel has to adjust the guiding and controlling technology, and make several additional adjustments depending on the selected configuration make-up. The pre-requisite for trouble-free operation is the correctness and accuracy of these adjustments. It is therefore necessary to make available to the operating personnel comprehensive aids so that the required adjustments can be made quickly and accurately.

One method of solving this problem is supplying the working equipment with comprehensive operating table books/manuals as required. Using these manuals, the operator would determine the necessary adjustments to be made depending on the given configuration/make-up, such as, for example the carrying load in the given case. The operator would then make the required adjustments with the help of suitable setting devices.

In view of the complexity and susceptibility to error of this method, it has been necessary to develop a system for preparing and setting up mobile working equipment that is as fully automatic as possible. For such purposes, it would have been necessary to store the entire data material contained in the operating manuals in tabulated form, in suitable databases. The stored data must then be retrievable based on the given configuration and data received by a sensor system. Once the necessary data is retrieved, the required adjustments would be made automatically depending on additional stored values.

Due to the expenditure required in terms of sensors for the acquisition of data on all make-ups/configurations, this solution was only rarely found to be favorable in practical application. Because of the safety regulations commonly associated with such fully automatic operating equipment, such equipment has to be shut down completely if only one sensor of the sensor system failed.

A far more practical solution was then created with the use of an interactive control console system consisting of a display and control unit. As used herein, the term "interactive" means that the displayed values depend on the parameters put in, and vice-versa. Such a display and control unit indicates all parameters required for the preparation and setup of the mobile working equipment. In addition, the system has control elements for all required inputs. As an additional aid for making decisions by the operating personnel, the individual display elements of the control console are explained by suitable symbols, and the control elements are combined in useful control groups. User guidance is provided by the clear arrangement of the interactive control console. Such a console is described in detail in the introduction to the operating manual of this applicant, which is designated in the "Operator's Handbook PAT DS 350".

In spite of all visualization aids and systematic arrangements of the control elements, it is not possible, even with such a control console, to avoid consistently confronting the user with the abundance of information that cannot be processed instantaneously. In addition, in order to offer the intended clarity and user guidance, the control consoles have to be very specifically and exactly adapted to the given type of mobile operating equipment with respect to the symbolism and arrangement of the control groups used.

SUMMARY OF THE INVENTION

The invention provides a method and control console for preparing and setting up mobile working equipment with variable configurations and/or different functions. The method and control console are used in connection with different mobile working gears/equipment and provide enhanced user guidance and interface.

The method provides a decision tree pertaining to the desired configuration of the working equipment that is to be procedurally completed. All required decisions for given configurations are divided into decision groups. The decision groups are subsequently displayed one after the other in a predetermined sequence on an interactive control console.

The user guidance is significantly enhanced in that all possible decisions and inputs for the user to make are broken down and displayed in individual decision groups. The individual decision groups will always be displayed and queried in a useful sequence.

Thus, the older method of flooding the user with information by a great number of instruments and different display values is avoided in that only one decision group is displayed in each case.

According to an advantageous embodiment, the individual decision groups are visualized by suitable pictographs. The pictographs provide the user with rapid information reception as well as re-recognition effect.

According to the invention, the method can be specifically adapted to the type of mobile working equipment used, as well as to the specific application. Thus, the user only receives the information required in their special application, and, as such, has to make only the decisions required for the particular application.

In a further embodiment of the method, the inputs by the user are taken into account in the subsequent process steps. This is particularly useful because previous decisions can limit or change subsequent decision groups in other ways.

A final general overview provides a sequential representation of the decisions made, and provides the user with the ability to confirm or adjust the decisions they just made. This increases the operational safety and user friendliness of the method and system.

According to the invention, an interactive control console for carrying out the method is also shown. The control console is connected to a data processing system, which is in reciprocal data connection with a display and control unit. The display and control unit enable the variable display of the respective decision groups and input possibilities for selecting the desired configuration of the working equipment, in addition to executing the inputs representing the decision.

The control console can be used in connection with all sorts of different working equipment/gears. The display and control elements can be optimally adapted to the given application of the specific working equipment without requiring a special control console for each operating gear. The control console activates corresponding software contained in the data processing system.

According to a particular embodiment of the invention, the control console is equipped with a variably controllable LCD-display with graphics capability. The display has a number of function keys which can be assigned to different functions. The assignable function keys can be specifically adapted to the given individual application depending on the desired control. If the control console is to be used in connection with another piece of working equipment, it is only necessary to change the software stored in the data processing system for controlling the display accordingly. Thus, it is possible, for example, to activate additional or other software modules.

No provision is made for a special input element for each input, however, the function keys available in connection with the display are assignable in different ways depending on the application and decision at hand. Consequently, the number of control elements required for preparation and setup of the operating equipment can be significantly reduced. Thus, the clarity of the control unit is distinctly enhanced and at the same time, the space requirements are reduced.

According to another embodiment, additional display and/or control elements are made available independently of the instantaneous control. This ensures that safety-relevant displays and/or inputs are always possible, such as, for example, an alarm display and an interrupt key.

The display and control console are controlled by a data processing installation dependent upon the data received via an array of sensors. The data received are variable parameters that are incorporated into the software program, such that the decisions required for setting up and preparing the operating equipment are displayed in the form of decision groups. The decision groups are indicated in accordance with a decision tree incorporated into the program. Due to the interaction between the data processing system and sensor array with the display and control unit, it is assured that only the instantaneously relevant decision possibilities are displayed in each case, and that such possibilities are selectable via the corresponding function keys. In this manner, the user is safely guided through the decisions required in connection with the particular configuration of the mobile operating equipment.

Since the data processing system is programmable, the interactive control console can be optimally adapted to the given operating equipment and potential fields of application. Furthermore, later modification of the interactive control console, for example in connection with any modernization of change of the operating equipment, is also possible. Thus, the possibility of programming can be provided by a suitable interface of the data processing system. By exchanging modules as required, it is also possible to operate several different mobile working implements with one interactive control console.

It is preferable if at least the data processing equipment is detachably connected to the mobile operating equipment. This would enable one to operate a number of mobile operating equipment systems with one data processing system. It is also possible to remove the entire interactive control console from the operating equipment in order to subsequently use such control console in connection with the same or other operating equipment.

The data processing system includes a comparator device that assures that the required standard specifications and/or safety regulations are adhered to when making up the desired equipment configuration.

The interactive control console can also be coupled with additional alarm devices, which are activated in case of flawed configurations.

BRIEF DESCRIPTION OF THE DRAWINGS

Other objects and features of the present invention will become apparent from the following detailed description considered in connection with the accompanying drawings. It is to be understood, however, that the drawings are designed as an illustration only and not as a definition of the limits of the invention.

In the drawings, wherein similar reference characters denote similar elements throughout the several views.

DETAILED DESCRIPTION OF THE PREFERRED EMBODIMENT

Figure 1:
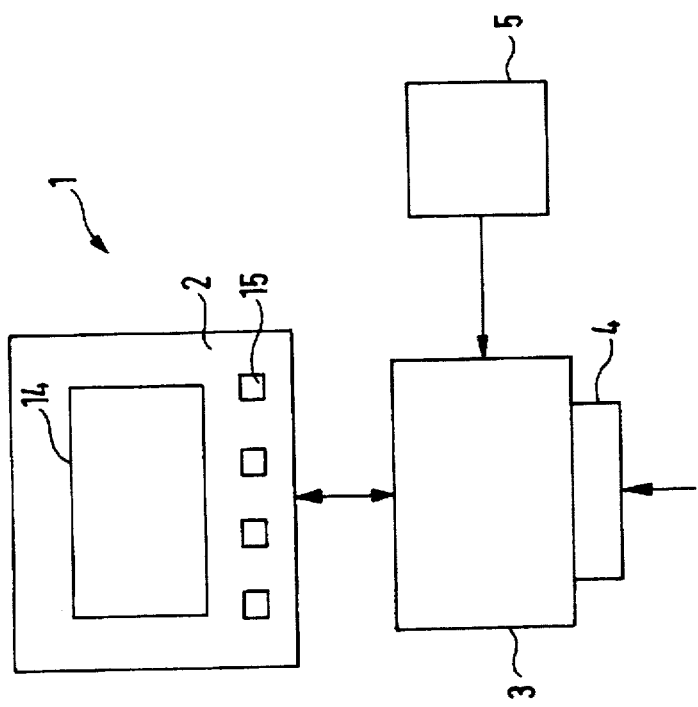
FIG. 1 is a block diagram of an interactive control console according to the invention.

Referring now in detail to the drawings and, in particular, FIG. 1, there is shown interactive control console 1 according to the invention. Control console 1 consists of a display and control unit 2 connected in two-way communication with data processing installation 3. Data processing installation 3 includes an interface 4 for connecting additional equipment such as, for example, input devices (not shown). In addition, data processing installation 3 is coupled with a sensor array 5 for acquiring the relevant measure data. Data processing installation 3 comprises at least one processor, a memory unit 8 and a comparator 9.

Interactive control console 1 is used for setting up and preparing a construction crane (FIG. 2) with variable configurations and functions.

Figure 2:
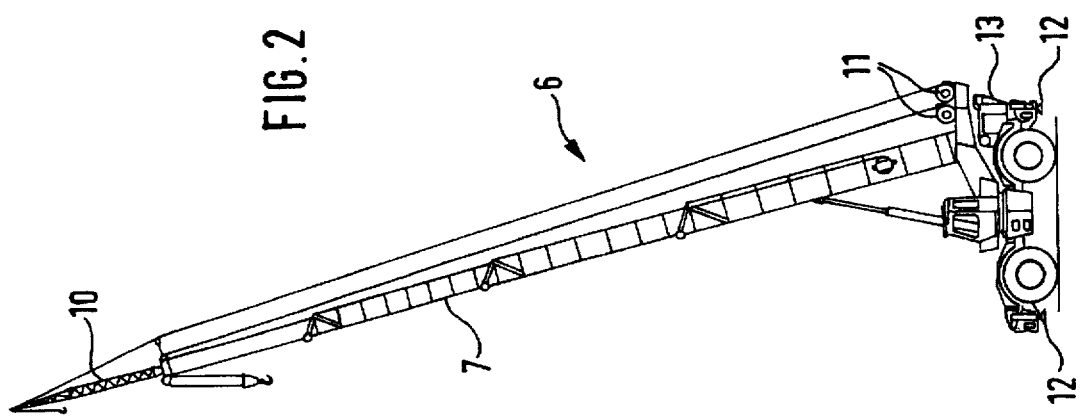
FIG. 2 is a lateral view of a mobile construction site crane.

Referring to FIG. 2, construction site crane 6 has a jib 7 with variable lengths and variable angles. Jib 7 can be fitted with different points 10 and can be operated in connection with different winches 11. Depending on the configuration features of crane 6, which are stated here by way of example only, additional configurations such as supports 12 or a suitable counterweight 13 have to be subsequently selected.

Figure 3:
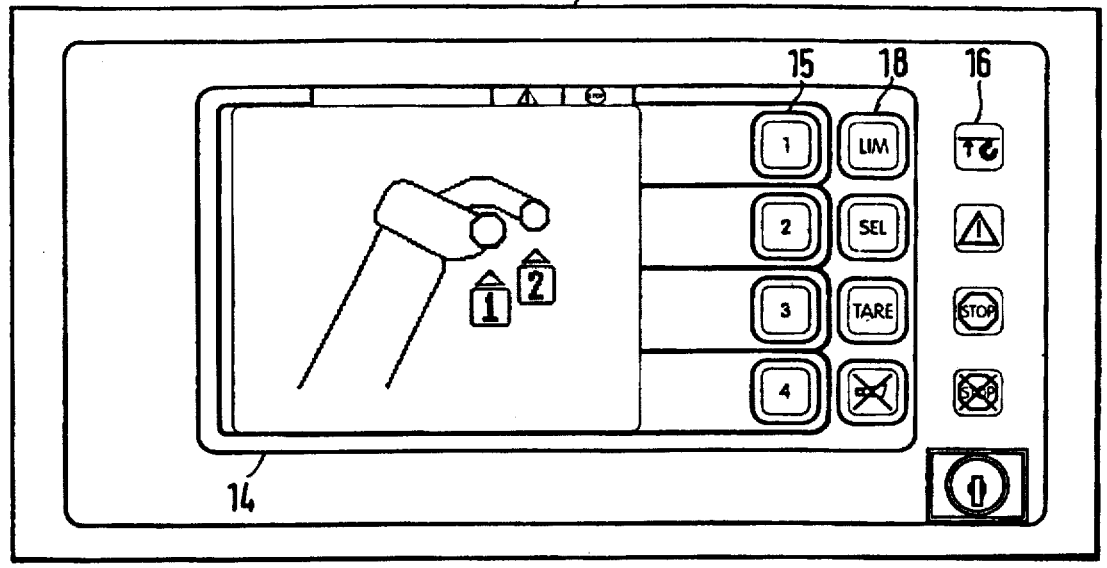
FIG. 3 is a front view of a display and control unit displaying a decision group.
Figure 4:
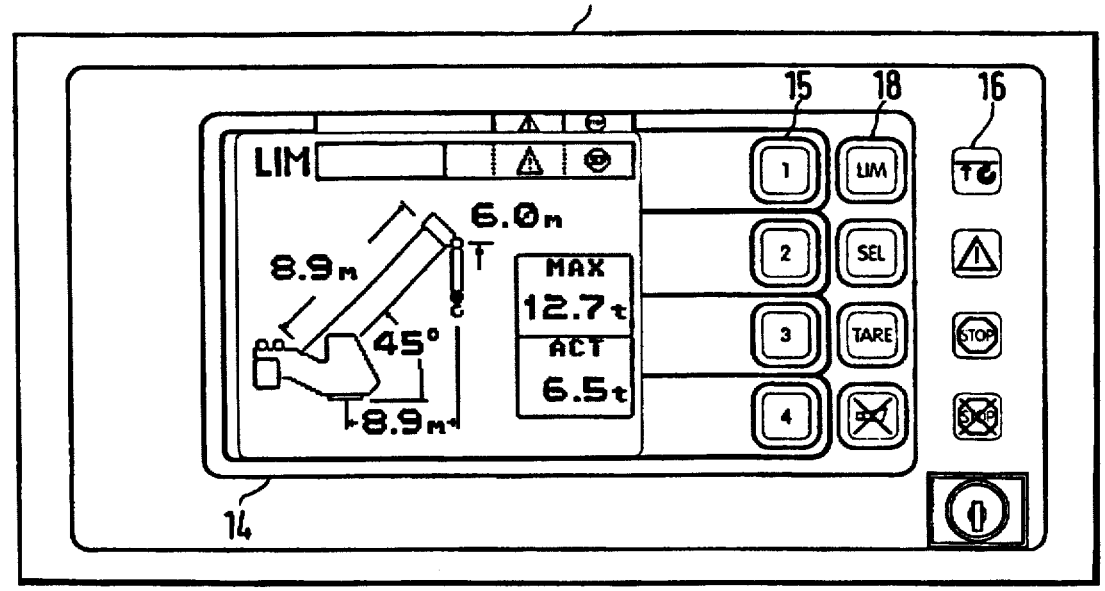
FIG. 4 is a display and control unit as the one in FIG. 3, displaying an overview representation.

Display and control unit 2 has a liquid crystal display (LCD) 14 with graphics capability and function keys 15, which can be selectively assigned to different functions. Display and control unit 2 includes a number of fixed indicator instruments 16 and controls keys 18 (FIGS. 3 and 4). Indicator instruments 16 and control keys 18 have fixed functions and primarily provide alarm and operation interrupt functions.

Construction site crane 6 is prepared for the work application such that all possible configurations of the crane are combined in decisions groups 21, 22, . . . , 29 (FIG. 5) and stored in data processing installation 3. In addition, all data required for the setup of construction site crane 6, such as, for example, corresponding carrying-load tables, are stored in data processing installation 3.

Data processing installation 3 is continuously supplied with the measured values acquired by the connected sensor array 5. Depending on all of the received information, the user is offered individual decision groups (21, 22, ..., 29) according to a pre-programmed decision tree. Decision groups (21, 22, ..., 29) are displayed in a useful sequence and with corresponding visualization on the LCD-display.

FIG. 3 shows the case of a decision required for the rollers of jib 7 without jib point 10. These are main roller 17 and an additional roller 20, of which one roller can be selected in each case by means of the correspondingly assigned function keys 15. In this manner, the user is guided, via a menu system, through the decisions required in connection with the setup of construction site crane 6. After all decisions needed for setting up crane 6 have been made, the user is able to review the configuration selected or input by them, by calling up a general overview screen 31 (FIG. 4). Subsequently, the user can either confirm the selected configuration, or can alter or change a decision previously made. If, as a result of corrected decisions, other decisions should become questionable, the questionable decisions are offered to the user again for their input.

Figure 5:
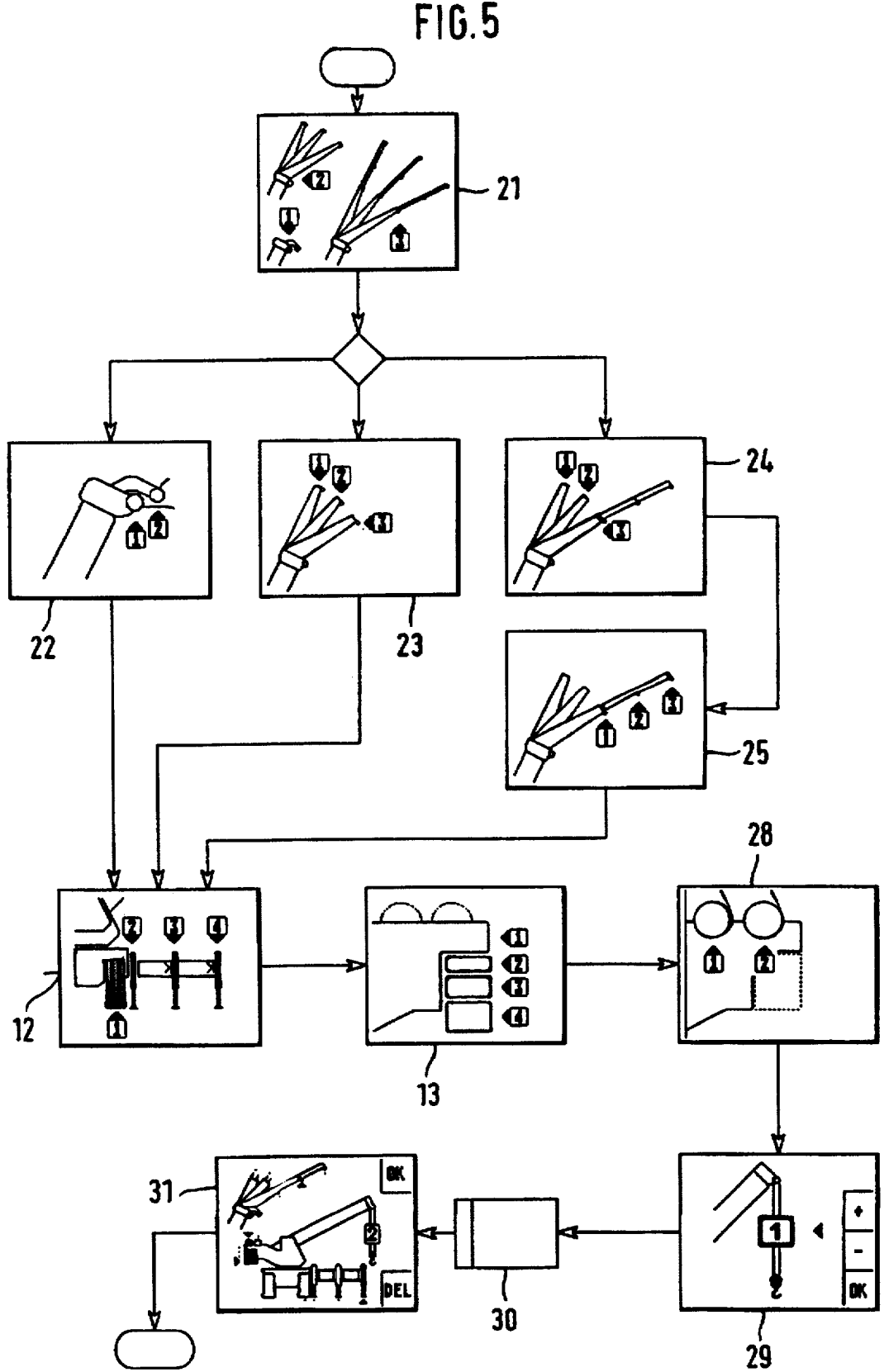
FIG. 5 is a flow diagram of the method for preparing and setting up the construction site crane.

FIG. 5 shows an example of a decision tree stored in data processing installation 3. The decision tree is offered to the user by way of visualizations/pictographs in a flow diagram on display and control unit 2. After starting the user menu, the user, in a first decision, can decide on desired jib point 10 (as indicated by assigned function key numbers 1, 2, 3). For this decision, the user is offered a first decision group 21 with corresponding assignment of function keys 15 (i.e., 1, 2, 3, etc). Depending on the decision made by the user, further decision groups 22, 23 and 24 are subsequently offered. When working with jib 7 without point 10, this involves a decision on rollers 17 or 20 to be used as illustrated by decision group 22. In connection with a conventional jib point 10, this involves decision group 23 concerning the respective angles, and in the case of a decision for a telescope jib, decision group 24 relating to the angle of the telescope jib is displayed. Decision group 24 on the angle of the telescope jib is supplemented by an additional decision group 25 relating to the length of the telescope jib.

After all of said decisions 21, 22, 23, 24, and 25 on jib 7 are made, decision group 26 is offered for a suitable support 12. Depending on decision 26 as to suitable support 12, it is possible to decide in a further decision 27 a suitable counterweight 13. Subsequently, the user is offered decision group 28 as to which winch 11 is to be used in connection with the configuration selected so far. In a last decision group 29, a decision is made on the shearing-in of the cable. With this decision, a decision is made as to the number of loops with which the cable carrying the load is guided across the jib roller.

Finally, it is possible to call in an overall general overview 31 of the selected configuration by means of a corresponding recall 3. If the user consents to the configuration shown by general overview 30, construction site crane 6 is set up exactly according to the input specified data.

All visualizations and decision groups offered are specifically adapted to the special type of construction site crane 6. By using different corresponding programming of memory unit 8 within data processing installation 3, the method of preparing and setting up can be specifically adapted to another type of operating equipment. The programming of memory unit 8 is performed through interface 4 and can be done at any time prior to the setting up of the given installation. Thus, it is also possible to make changes in the amount of data to be processed even with a later change of construction site crane 6, for example by later adding sensors not originally present. Furthermore, different program modules for different types of operating equipment can be stored in data processing installation 3, and activated when required.

The method of the invention and control console 1 suitable for carrying out the method provide the necessary instrumentation for the preparation and setup of all types of different mobile working equipment that can be used in many different ways. In addition, the user guidance in the preparation and setup of construction site equipment is enhanced such that even the most complicated configurations can be implemented by the usual operating personnel, free of errors and in conformity with applicable safety regulations.

Accordingly, while several embodiments of the present invention have been shown and described, it is obvious that many changes and modifications may be made thereunto without departing from the spirit and scope of the invention.

What is claimed is:

1. A method for the preparation and setup of mobile working equipment (6) having variable configurations and/or different functions dependent upon the working application, the method comprising the steps of:

providing an interactive control console for displaying and receiving user information;

providing function keys on the interactive control console for inputting user decisions;

generating a decision tree pertaining to a desired configuration of the working equipment;

sequentially displaying individual decision groups from the generated decision tree in the form of pictographs on the control console;

receiving user decisions for each sequentially displayed decision group, said decisions being dependent on previously-made decisions and inputs; and configuring the mobile working equipment in accordance with the received user decisions.

2. The method according to claim 1, wherein the sequence of displayed decision groups for a working application is dependent upon the working application parameters and the working equipment.

3. The method according to claim 1, further comprising the step of sequentially displaying the received user decisions in a general overview format prior to configuring the mobile working equipment.

* * * * *